May 22, 1923. Re. 15,612

E. NORDSTROM

BOTTLE CAPPING MACHINE

Original Filed April 6, 1916 3 Sheets-Sheet 1

Inventor:
Elof Nordstrom
by Knight Bros
Attorneys

May 22, 1923. Re. 15,612
E. NORDSTROM
BOTTLE CAPPING MACHINE
Original Filed April 6, 1916 3 Sheets-Sheet 2
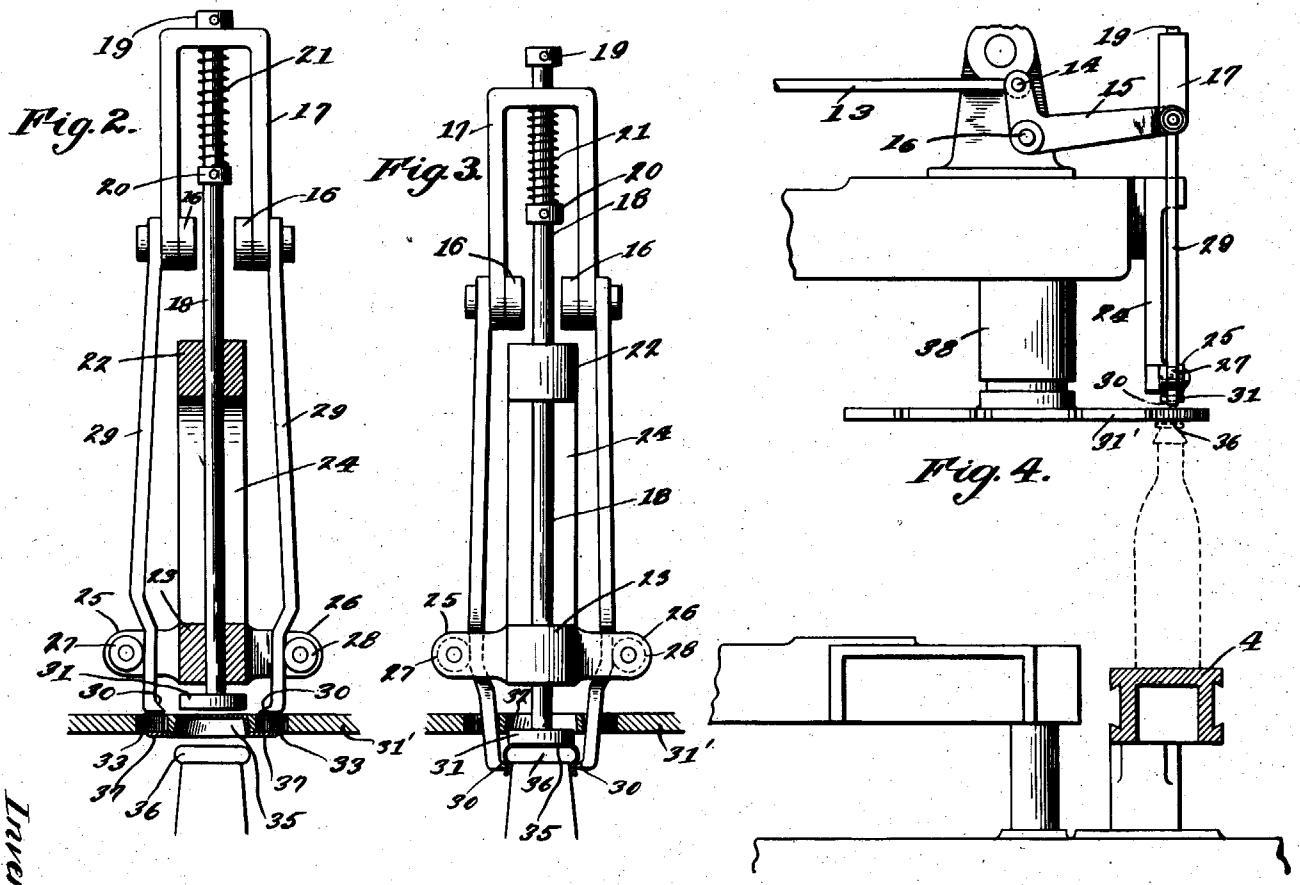
Inventor:
Elof Nordstrom
by Knight Bros
Attorneys May 22, 1923. Re. 15,612

E. NORDSTROM

BOTTLE CAPPING MACHINE

Original Filed April 6, 1916 3 Sheets-Sheet 3

Inventor:
Elof Nordstrom
by Knight Bros
Attorneys

Reissued May 22, 1923. Re. 15,612

UNITED STATES PATENT OFFICE.

ELOF NORDSTROM, OF EAST ORANGE, NEW JERSEY, ASSIGNOR, BY MESNE ASSIGNMENTS, TO AMERICAN DAN BOTTLE SEAL CORPORATION, A CORPORATION OF DELAWARE.

BOTTLE-CAPPING MACHINE.

Original No. 1,303,580, dated May 13, 1919, Serial No. 89,363, filed April 6, 1916. Application for reissue filed May 13, 1921. Serial No. 469,372.

*To all whom it may concern:*

Be it known that I, ELOF NORDSTROM, a citizen of the United States, residing at East Orange, in the county of Essex and State of New Jersey, have invented certain new and useful Improvements in Bottle-Capping Machines, of which the following is a specification.

This invention relates to bottle capping machines and has for its primary object to provide an improved construction, combination and arrangement of parts whereby a machine of this character, is adapted to be operated more rapidly and in a more economic manner. It is old in the art to provide a movable table for carrying a cap into position to be ejected therefrom and applied to a bottle. It is also well known in the art to crimp the cap onto the bottle during the time in which the parts occupy the same relative positions as they do when the cap is ejected. Heretofore, the cap ejecting movement as well as the cap clinching operation has been carried on above the cap carrying table, it therefore being necessary to provide means for elevating the bottle and thus causing its neck to be presented upwardly thru the table or carrier, a situation being thus created which is undesirable with regard to its effect on the speed of operation and the relation between cooperating elements of the machine. I have found certain inherent advantages in constructing a bottle capping machine according to the following specification, such advantages being derived by inserting from below into the cap carrier, a cap which is ready to be crimped after it has been ejected downwardly onto a bottle and crimped in place on said bottle by crimping mechanism which moves downwardly past the table during the time that the table is above the bottle. A machine constructed on this principle is more especially applicable to bottle caps which have extended ears or lugs, it being obviously more desirable to eject such a cap downwardly out of the table than to force it upwardly thru said table. With respect to the speed of the operation of such a machine it has been found to be of distinct advantage to have the cap ejecting and cap crimping devices normally above the cap carrying table and operating past said table for performing their necessary operations below said table, the reason for this being that the bottles may be smoothly and quickly slid into position, because they have a clear and unobstructed path between their supporting table below and the cap bearing plate above; the distance between said table and holder being greater than the height of the bottle.

One of the objects of the present invention is to provide improved means for partially crimping a cap upon a bottle to prevent its accidental displacement while the bottle is being conveyed into position to have the cap securely crimped in position. Other and further objects will appear in the specification and be pointed out in the appended claims, reference being had to the accompanying drawings which exemplify my invention in its preferred embodiment and in which drawings:—

Figure 2 is a front elevation on an enlarged scale of the combined cap applying and preliminary crimping mechanism, adjacent parts of the machine being shown in section;

Figure 3 is a similar view showing the parts in changed positions;

Figure 4 is a side elevation of the same showing contiguous parts of the machine, parts being broken away and parts shown in section;

Figure 7:
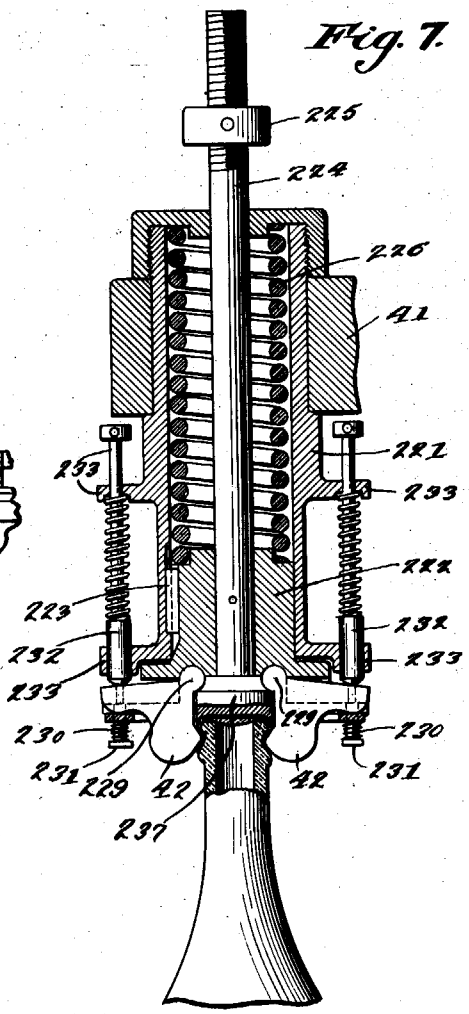
Figure 7 is an axial section on an enlarged scale of one of the cap crimping units, parts being shown in elevation.

In the embodiment of my invention shown on the drawings, a frame 1 is provided with suitable means for mounting a plurality of nuts 2, which may be operated in any suitable manner to raise and lower the threaded bolts 3, which carry a suitable bedplate or table 4, over which filled bottles may be fed by suitable mechanism therefor. For this purpose, a double star wheel 5 is arranged adjacent one end of the plate or table 4 to laterally displace the bottles one by one into a line of feed over the plate or table 4 in such a way as to pass successively under the capping and preliminary crimping mechanism as well as the final crimping mechanism, such mechanisms being hereinafter fully described. As pointed out in my previous Patent 1,212,665 January 16th 1917, means for feeding the vessels are provided by reciprocatory pairs of bottle engaging gripper bars 6 and 7, the former being adapted to move the filled bottles one by one from the star wheels 5 into position below the capping and preliminary crimping mechanism and thence to a point within the reach of the reciprocatory members 7, which move said bottles two by two into position beneath the double crimping heads to be hereinafter referred to.

Figure 5:
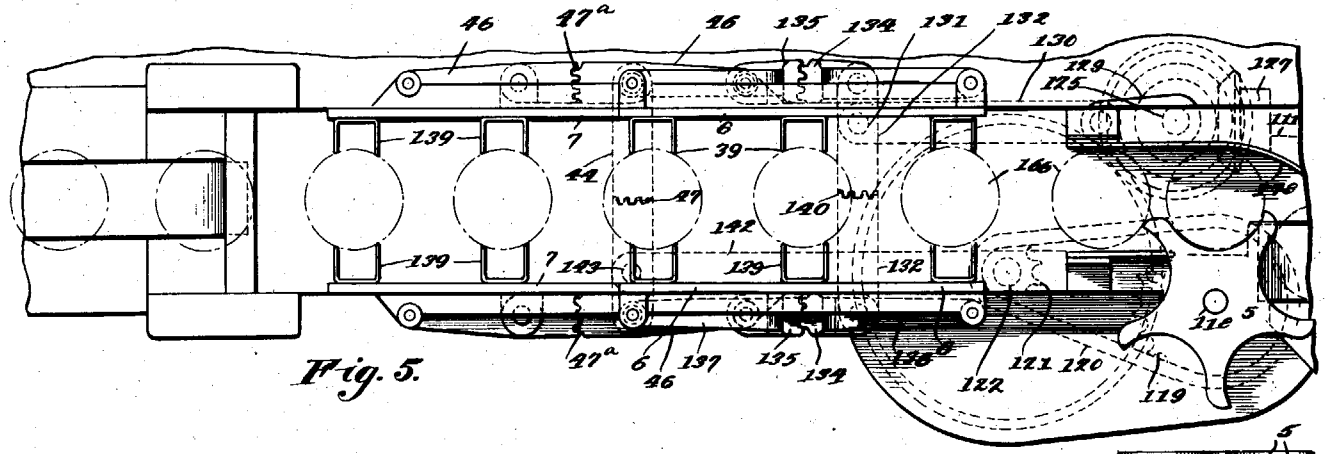
Figure 5 is a top plan view on an enlarged scale of the conveyer mechanism, parts being broken away.
Figure 6:
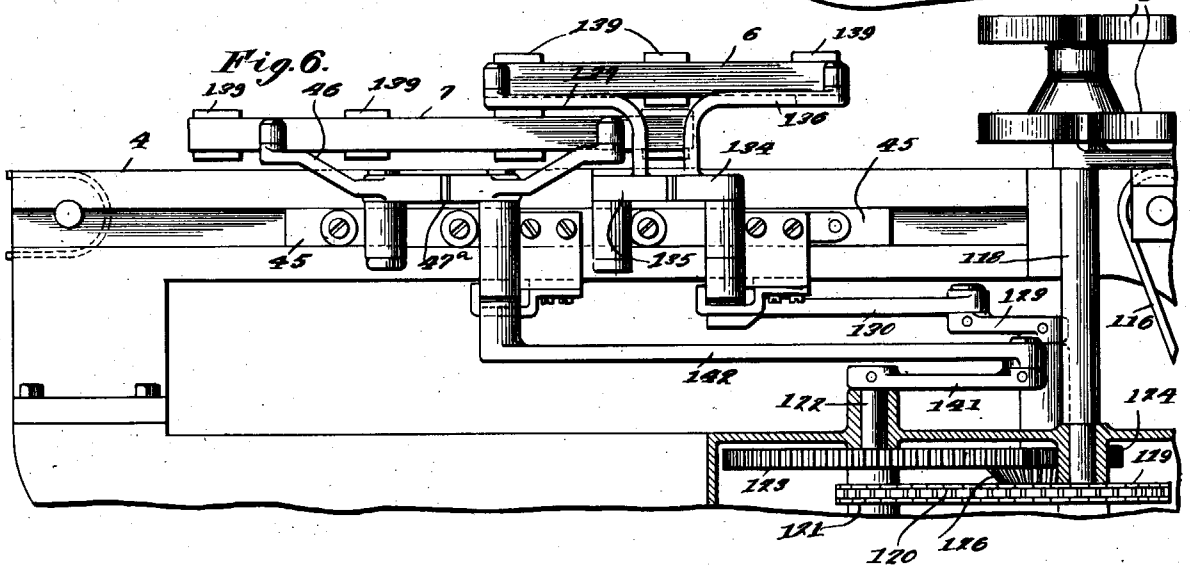
Figure 6 is a side elevation of the same, parts being broken away and parts shown in section.

As shown in Figs. 5 and 6, shaft 118 has keyed thereto a sprocket wheel 119, over which runs a chain 120 for rotating a smaller sprocket 121 keyed to a shaft 122 (see Fig. 6). The shaft 122 carries a gear 123 which meshes with a gear 124 mounted on a spindle 125 which carries a bevel gear 126, said bevel 126 being in mesh with a similar gear 127 carried by the shaft 111. Cooperating with the rotary conveyer is a curved guide 128, with a tangential portion extending along the table 4. As shown in Fig. 5, said rotary conveyer places the vessels successively into position to be engaged by a reciprocatory conveyer. Keyed to the shaft 125 is a crank arm 129 to which one end of a connecting rod 130 is pivoted. The other end of said connecting rod is pivoted at 131 to one of a pair of arms 132 which are geared together and journaled on slides 45. Arranged above and oscillatable with the arms 132 respectively, the upper arms 134 are geared to similar arms 135 which are also journaled on the slides 133. Arms 134 and 135 carry brackets 136 and 137, upon the outer ends of which the opposite ends of a gripper bar 6 are pivotally mounted. Said gripper bar carries suitable grippers 139. A crank arm 141 carried by the shaft 122 is connected to one end of a connecting rod 142, the other end of said connecting rod being pivoted on a pin 143 carried by one of a pair of interengaging lever arms mounted on pintles which are journaled on oppositely arranged slides 45. Said slides reciprocate in the dove-tailed grooves formed in the aprons to feed table 4, the above mentioned slides 45 being mounted in the same grooves. The connecting rod 142 is thus adapted to simultaneously oscillate pivotally mounted arms 46 which are geared at 47 for this purpose. Pivotally connected to the arms 46 on either side of the feed table is a gripper bar 7 which is also provided with grippers 139.

Figure 1:
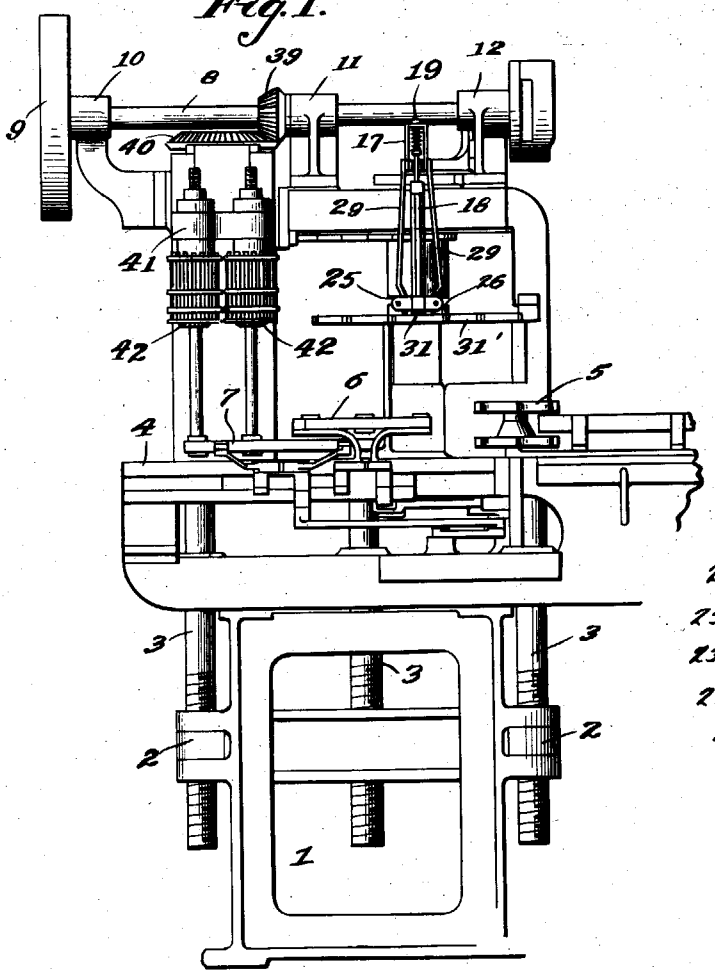
Figure 1 is a front elevation of a machine constructed in accordance with the principles of my invention, parts being broken away.

A shaft 8 which carries a fly-wheel 9, is journaled in bearings 10, 11 and 12 and receives its power in a manner shown and described in my Patent No. 1,212,665 referred to above. Power from the shaft 8 is delivered to the preliminary crimping and clamping mechanism shown in Figs. 2, 3 and 4 by suitable gear and shafting connections shown fully in the above mentioned patent, such power being thus transmitted to a connecting rod 13 (see Fig. 4) pivotally connected at 14 to the bell crank lever 15, which is journaled on a pin 16. The forwardly presented arm of the bell crank lever 15 is bifurcated, the branches 16 thereof being pivotally connected to a yoke 17 which is apertured to accommodate the upper end of a plunger 18, the upper end of said plunger being provided with a collar 19 which limits the downward displacement of said plunger. Interposed between the upper end of yoke 17 and a collar 20 which is pinned to the plunger 18, is a spring 21 which tends to hold the plunger 18 in its lowermost position. Said plunger is reciprocably mounted in the bosses 22 and 23 which are carried by a fixed bracket or support 24. Projecting laterally from the lowermost boss 23 are arms 25 and 26 which serve to mount anti-friction rollers 27 and 28. Pivotally connected to the branches of the yoke 17 are the preliminary crimping elements 29 which are bowed outwardly intermediately of their ends, but have their lower ends offset inwardly and provided with crimping jaws 30. A rotary table 31′ is provided with a plurality of cap-shaping dies or sockets 32 which are flanked on either side by openings 33 to accommodate the downward movement of the crimping jaws 30. The lower end of the plunger 18 is provided with an enlargement 31 which is adapted to flatly engage the top wall of a cap 35 which is carried in the socket 32. When the yoke 17 is moved downwardly, the plunger 18 will displace the cap from the socket 32 on to the neck 36 of a bottle, which has been automatically disposed in position to receive the same. The crimping elements 29 partake of the downward movement of the plunger 18 and passing through the openings 33 on either side of the cap-holding socket, engage the lobes 37 of the cap 35. If the downward movement of the yoke 17 continues, the movement of the plunger 18 is interrupted while the crimping elements 29 continue their downward movement, thus serving to displace the lobes 37 about the neck 36 of the bottle. Toward the end of this movement, the outwardly bowed portion of the crimping elements 29 are pressed inwardly between rollers 27, 28, in such a way as to force the crimping jaws 30 in under the neck 36 sufficiently to secure the cap 35 against displacement during the subsequent movement of the bottle to the complete crimping mechanism. The rotary table 31′ is carried by the lower end of a shaft journaled in the bearing 38, the said shaft being driven by suitable connections from the shaft 8. Referring now to Fig. 1, the shaft 8 carries a beveled pinion 39 which meshes with a bevel gear 40 on the upper end of a shaft which vertically reciprocates the compound crimping head 41, said crimping head being provided with radially disposed crimping elements 42.

The band 41 which is reciprocably mounted serves to support a socket 221 within which is reciprocably mounted a slide 222, held against rotation by means of a spline 223. The slide 222 is carried by a rod 224, which passes through the upper end of socket 221 and is limited in its downward movement by an adjustable cap or nut 225. Interposed between the upper end of the socket and the slide 222 is a spring 226. The lower end of the rod 224 carries a cap-engaging member 227. Radially disposed with respect to said member 227 are a plurality of crimping elements 42 which oscillate about their rounded lugs 229. The elements 42 project through radial slots in slide 222 and are normally held in outward position by means of springs 230, which are carried by studs 231 on projecting portions of slide 223. Whenever the socket 221 is forced downwardly, the member 227 rests upon the cap and forces it into the position on the neck of a bottle. When the slide 222 is brought to rest, a plurality of plungers 232 which are mounted in flanges 233, are forced down onto the elements 228 so as to move them into the position to crimp the cap and firmly secure it to the vessel.

The operation of my improved machine will now be readily understood, and briefly described is as follows:

Filled vessels are fed one by one along the plate or table 4 under the capping plunger 18, which descends and forces a cap from one of the sockets 32 in the rotary plate 31′, down onto the neck of the bottle therebeneath. Accompanying this movement, the crimping elements 29 come into engagement with the lobes 37 and as shown in Fig. 3, impart a preliminary crimping action which secures the cap to the bottle for its movement from the plunger under the action of the bottle conveying clamps 6. As pointed out in my above mentioned patent, the clamps 6 move inwardly toward each other at one end of their movement, and outwardly therefrom at the other end of their movement and by their reciprocation along the plate or table 4, move the bottles one by one into position to be engaged by the similar reciprocating grippers 7 which move them two by two at one-half the speed into position under the double crimping mechanism where said bottles are acted upon two by two to completely crimp the caps into position thereon.

I claim:—

1. In a machine of the character described, the combination with cap applying and preliminary crimping means, means for feeding vessels to and from said cap applying and crimping means, final cap crimping means, and means operating at a different speed than the first mentioned feeding means for feeding vessels from the first mentioned feeding means to said final cap crimping means.

2. In a machine of the character described, cap applying means which act at relatively short intervals, cap crimping means cooperating with said cap applying means to apply a preliminary crimping to the cap, other cap crimping means which act at relatively long intervals on a relatively large number of vessels, and means for feeding single vessels to and from the cap applying and preliminary crimping means and means for feeding a plurality of vessels from the preliminary crimping means to the final crimping means.

3. In a bottle capping machine, cap applying means, final cap crimping means, means for feeding vessels from said cap applying means to said cap crimping means, a rotary table provided with cap holding sockets arranged between said vessel feeding means and the cap applying means and a preliminary crimping device normally arranged above said cap holding table and adapted to be operated downwardly past said table to impart a preliminary crimp to a cap as it is applied to a vessel.

4. In a machine of the character described, the combination with a fixed guide or support, of cap-holding means, a cap-applying plunger movable past said cap-holding means for displacing a cap therefrom onto a bottle, and cap-crimping means movable with said plunger and operated by engagement with said fixed guide or support for crimping the applied cap.

5. In a machine of the character described, cap-applying means including cap-holding means, a reciprocating plunger for displacing a cap from said cap-holding means onto the neck of a bottle, cap-crimping means partaking of the movement of said plunger, and stationary means suitably disposed to engage said cap-crimping means during its movement, to effect the crimping action.

6. In a machine of the character described, cap-applying means including cap-holding means, a reciprocating plunger for displacing a cap from said cap-holding means onto the neck of a bottle, cap-crimping means partaking of the movement of said plunger, and stationary means suitably disposed to engage said cap-crimping means during its movement to effect the crimping action, said crimping means including suitable crimping elements yieldably connected to said cap-applying means.

7. In a machine of the character described, a stationary guide or support, cap-holding means, a cap-applying plunger reciprocably mounted on said guide or support for displacing a cap from said cap-holding means onto the neck of a bottle, crimping elements yieldably connected to said plunger, and means mounted on said guide or support for moving said crimping elements to effect the crimping action thereof.

8. In a machine of the character described, the combination with a movable table provided with cap-holding sockets, of a fixed guide or support mounted above said table, a bottle support arranged below said table, a member movable toward and away from said guide or support, a cap-applying plunger reciprocable in said guide or support, said plunger being yieldably connected to said member, cap-clenching arms carried by said member, said arms being normally held out of their clenching position, and means carried by said guide or support and engaging said cap-clenching arms to effect the clenching action.

9. In a machine of the character described, the combination with a bottle support, of a yoke movable toward and away from a bottle on said support, a reciprocable cap-applying plunger, connected to said yoke, means for feeding caps into position between said plunger and the neck of a bottle on said support, flexible crimping arms connected to said yoke, and means stationed between said yoke and table and in the paths of said crimping arms to force them into crimping engagement with a cap.

10. In a machine of the character described, the combination with a bottle support, of a yoke having its branches presented toward said bottle support, means for moving said yoke toward and away from said bottle support, means for moving bottles over said support, a fixed guide or support arranged between the bottle support and said yoke and having spaced bearing lugs coaxial with a bottle in position to be capped on said bottle support, a plunger reciprocably mounted in said bearing lugs and connected to said yoke, intermediately of the branches thereof, flexible crimping arms connected respectively to the branches of said yoke, and means carried by said fixed guide or support for engaging said crimping arms to effect the crimping action.

11. In a machine of the character described, the combination with a bottle support, of means for conveying a cap into position to be applied to the neck of a bottle on said support, a yoke having its branches presented toward said bottle support, means for moving said yoke toward and away from said bottle support, a fixed guide or support arranged between the bottle support and said yoke and having spaced bearing lugs coaxial with a bottle in position to be capped on said bottle support, a plunger reciprocably mounted in said bearing lugs and connected to said yoke intermediately of the branches thereof, flexible crimping arms connected respectively to the branches of said yoke, and means carried by said fixed guide or support for engaging said crimping arms to effect the crimping action, said crimping arms being provided with portions offset inwardly toward each other and intermediately of rollers carried by said fixed guide or support and constituting the crimping arms engaging means.

12. In a machine of the character described, a table provided with cap-holding sockets and openings therethrough corresponding to the positions of finger lobes on caps held in said sockets, means for presenting a bottle into position to have a cap transferred from one of said sockets to the neck of said bottle, a plunger for applying the cap to the neck of said bottle, flexible crimping arms movable with said capping plunger, said crimping arms being suitably arranged to pass through the openings in said table for pressing the lobes of said cap downwardly, and means for displacing said flexible arms inwardly to crimp the cap on the neck of said bottle.

13. In a machine of the character described, means for simultaneously applying and preliminarily crimping a cap, means for finally crimping a cap, and means for feeding vessels to said cap applying and preliminarily crimping means and from there to the final crimping means.

14. In a machine of the character described, means for holding a cap, a cap-applying plunger for displacing a cap therefrom onto a bottle, cap crimping elements concentrically arranged with respect to said plunger, means for reciprocating said plunger and cap crimping elements together, said means permitting said plunger to yield relatively to said crimping elements, and means for inwardly deflecting said crimping elements by means of their reciprocatory movements.

ELOF NORDSTROM.